United States Patent [19]

Sato

[11] Patent Number: 5,415,361
[45] Date of Patent: May 16, 1995

[54] DATA CARTRIDGE

[75] Inventor: Masanori Sato, Miyagi, Japan

[73] Assignee: Sony Corporation, Tokyo, Japan

[21] Appl. No.: 102,341

[22] Filed: Aug. 5, 1993

[30] Foreign Application Priority Data

Aug. 10, 1992 [JP] Japan .................................. 4-232621

[51] Int. Cl.⁶ .......................................... G11B 23/087
[52] U.S. Cl. .................................................. 242/352.4
[58] Field of Search ................... 242/342, 352.3, 352.4

[56] References Cited

U.S. PATENT DOCUMENTS

| | | | |
|---|---|---|---|
| 4,123,789 | 10/1978 | Shatavsky | 242/352.3 |
| 4,172,569 | 10/1979 | Newell | 242/352.4 |
| 4,198,013 | 4/1980 | Anglin | 242/352.4 |
| 4,607,808 | 8/1986 | Collins | 242/352.4 |
| 4,688,742 | 8/1987 | Hettich | 242/352.4 |
| 5,203,519 | 4/1993 | Rotter | 242/342 |
| 5,239,436 | 8/1993 | Aizawa et al. | 242/342 |
| 5,289,988 | 3/1994 | Madsen | 242/342 |
| 5,335,131 | 8/1994 | Sato et al. | 242/342 X |

Primary Examiner—John P. Darling
Attorney, Agent, or Firm—William S. Frommer; Alvin Sinderbrand

[57] ABSTRACT

A Pegasus-type data cartridge which reduces the drive speed and rotational load on a pair of left and right corner rollers and stabilizes the tape tension and tape drive force by employing a pair of left and right corner rollers whose outer diameters are 4.5 times the inner diameters thereof, such that even when the tape drive speed is high, an increase in the characteristic values of the tape tension and the tape drive force is reduced. Also, the length of the small width section of the cartridge in the insertion/extraction direction of the cartridge insertion slot of a recording/playback device is formed longer than the depth to which the small width section is inserted into the cartridge insertion slot, and the connecting surfaces connecting the left and right side surfaces of the small width section and the left and right side surfaces of the large width section are formed in a substantially tapering shape which widens in the extraction direction away from the cartridge insertion slot, such that when the small width section of the cartridge is inserted into the cartridge insertion slot, a space large enough for the operator to insert his/her finger therebetween is formed between one of the connecting surfaces and the eject button of the front panel of the recording/playback device.

2 Claims, 6 Drawing Sheets

DATA CARTRIDGE

BACKGROUND OF THE INVENTION

The present invention relates to a Pegasus-type data cartridge which is capable of high-density recording (back memory) of e.g. CPU data.

The Pegasus-type data cartridge is disclosed in, for example, Japanese Patent Application H2-400760 filed by the present applicants.

Figure 3:
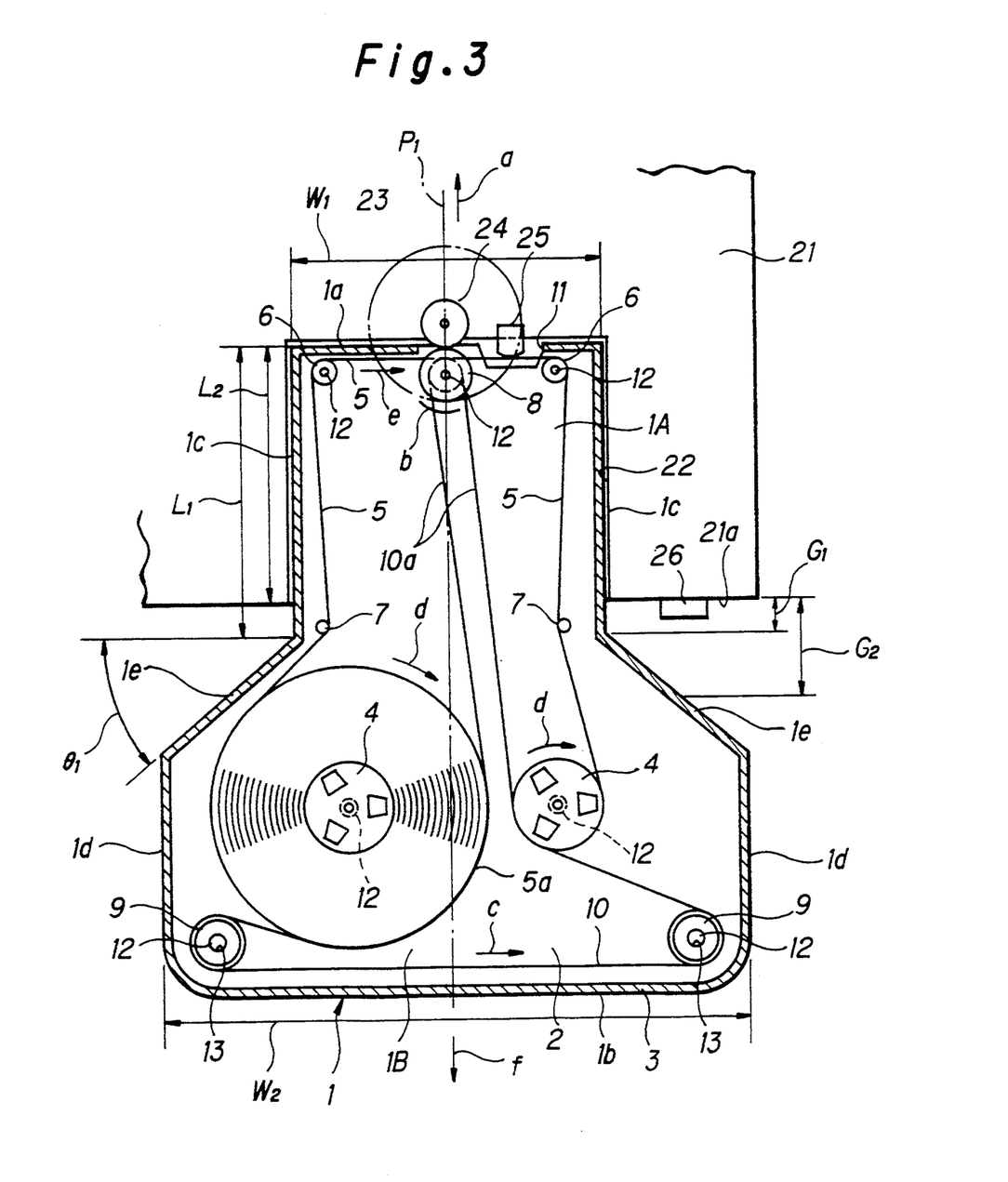
FIG. 3 is a cross sectional plan view showing the Pegasus-type data cartridge of the present invention.
Figure 4:
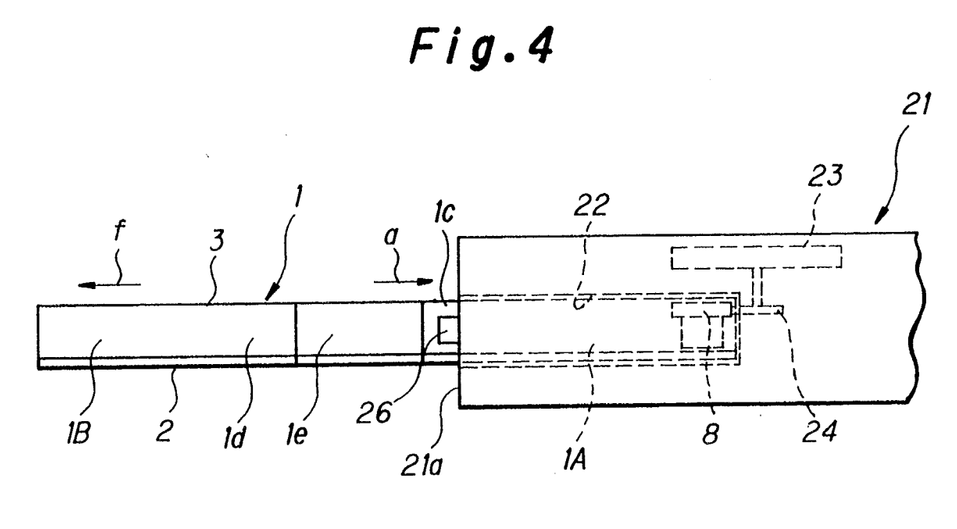
FIG. 4 is a side view of the data cartridge shown in FIG. 3.
Figure 6:
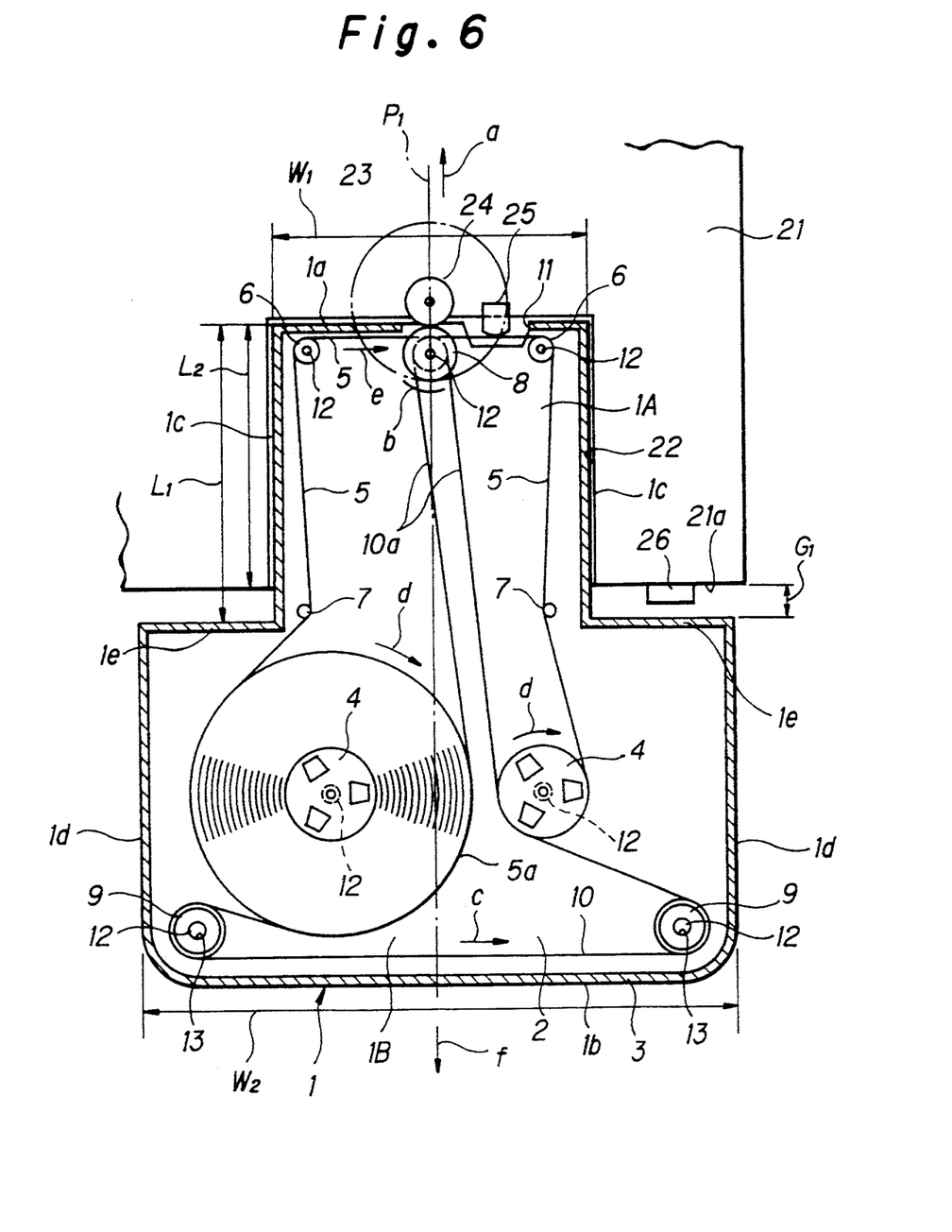
FIG. 6 is a cross sectional plan view showing the Pegasus-type data cartridge of the present invention.

In this type of Pegasus data cartridge, as shown in FIGS. 3, 4 and 6, a cartridge 1 is formed by attaching, with screws or the like, a thin box shaped upper cover 3 formed of a transparent synthetic resin to a top of a metal base plate 2 made of aluminum or the like. In addition, the cartridge 1 has a small width section 1A having a smaller width W1 in the transverse direction in FIG. 3, and a large width section 1B having a larger width W2, which are integrally formed and are symmetrical in the transverse direction with respect to a cartridge center line P1.

A pair of left and right tape reels 4 are rotatably supported in the large space in the large width section 1B so as to be symmetrical in the transverse direction with respect to the cartridge center line P1. A magnetic tape 5 wound around the pair of tape reels 4 is guided by a pair of left and right tape guides 6 and 7 which are attached to be symmetrical relative to the cartridge center line P1 in the small width section 1A, and is conveyed in an inverted squared U shape along a front face 1a of the small width section 1A.

A drive roller 8 is rotatably supported in the small width section 1A of the cartridge 1 on the cartridge center line P1 and on the inside of the magnetic tape 5, and a pair of left and right corner rollers 9 are rotatably supported in identical left and right corner sections toward a rear face 1b of the large width section 1B opposite the small width section 1A to be symmetrical relative to the cartridge center line P1.

A drive belt 10 made of rubber or the like with elasticity is wound at a high tension in an inverted T-shape around and between the drive belt 8 and both corner rollers 9. A pair of left and right drive sections 10a of the drive belt 10 between the drive roller and the corner rollers 9 are wound around the outer circumferences of both tape reels 4 and are brought into pressure contact with the outer circumferences of tape winding sections 5a of the magnetic tape 5.

A notch 11 is formed in the base plate 2 and the upper cover 3 at the front face 1a of the small width section 1A. Also, the tape reels 4, the tape guides 6, the drive roller 8 and the corner rollers 9 etc. are rotatably supported through their center holes 13 on metal support shafts 12 implanted in the base plate 2.

Figure 1A:
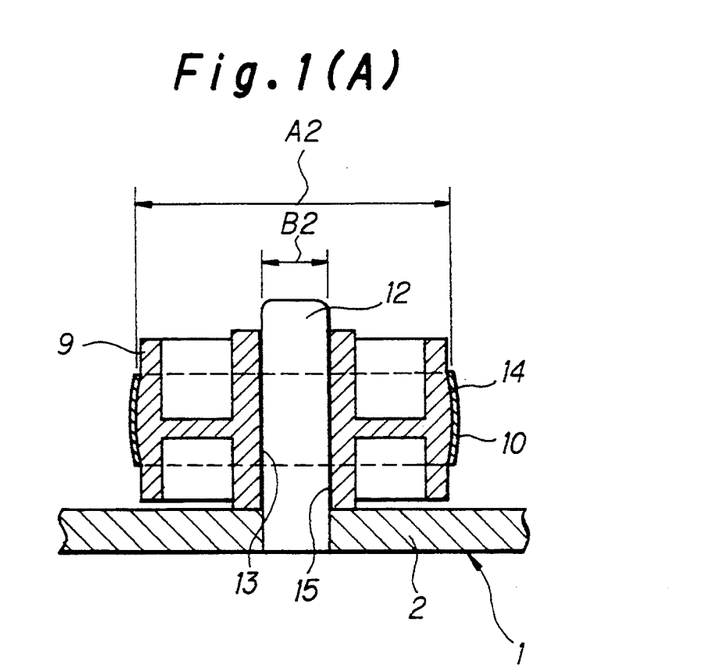
Figure 1B:
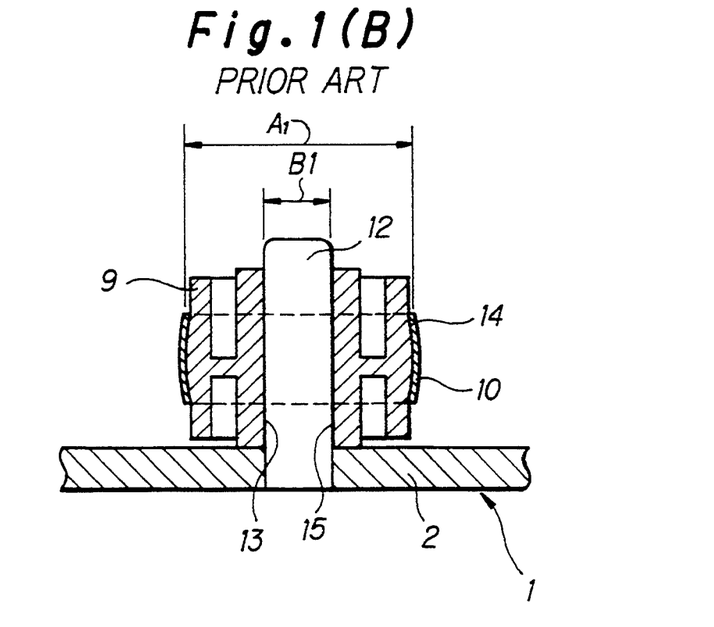
FIG. 1(B) is a cross sectional side view illustrating a corner roller of the Pegasus-type data cartridge of the prior art.

As shown in FIG. 1(B), both corner rollers 9 (as well as the drive roller 8) are made of synthetic resin such as polyacetal resin or the like, an integrated belt-winding surface 14 is formed on the outer circumferences of these rollers, and torque control grease 15 is filled into the center holes 13 thereof.

With this type of Pegasus data cartridge, the small width section 1A of the cartridge 1 is inserted in the direction of an arrow a (see FIG. 4) into a cartridge insertion slot 22 formed in the front panel of the record/playback device 21. Then, an output roller 24 and magnetic head 25, which are rubber rollers drivingly rotated by a spindle motor 23 inside the recording/playback device, are reciprocatingly inserted into the notch 11 of the cartridge 1, so that the output roller 24 and magnetic head 25 press and contact against the drive roller 8 and the magnetic tape 5.

Accordingly, in the installed state of the cartridge 1 in the recording/playback device 21, the large width portion 1B projects in a transversely symmetrical state from the cartridge insertion slot 22.

With the thus installed cartridge, according to an instruction signal from a CPU, the drive roller 8 is drivingly rotated in a direction of an arrow b (see FIG. 3) and the drive belt 10 is driven in the direction of an arrow c by the output roller 24, both tape reels 4 are drivingly rotated in a direction of an arrows d by the drive sections 10a of the drive belt 10 via the tape winding sections 5a, and the magnetic tape 5 advances at a high speed of 25 to 120 inches/sec. in a direction of an arrow e. The data of the CPU are recorded on or played back from the magnetic tape 5 by the magnetic head 25.

Additionally, since this type of Pegasus data cartridge, in the state where it is installed in the recording/playback device 21, has the large width section 1B projecting outside the cartridge insertion slot 22 and the pair of tape reels 4 rotatably received in the large space inside the large width section 1B, can house the magnetic tape 3 having a sufficiently large diameter on the tape reels 4 to record a large volume of data from the CPU.

When an eject button 26 provided in the front panel 21a is pushed by the user's finger, this cancels the lock of the small diameter section 1A inside the cartridge insertion slot 22 and the cartridge 1 can be ejected from the cartridge insertion slot 22 in a direction of an arrow f.

However, in a Pegasus data cartridge of this type, a speed difference occurs between the drive sections 10a of the drive belt 10 due to the rotation load imposed on the corner rollers 9, and there is a fixed tension and tape drive force between the two tape reels 4 for holding the magnetic tape 5. Consequently, if variations in the tape tension and tape drive force are increased, there are problems of inadequate contact between the magnetic tape 5 and the magnetic head 25, insufficient tape advance of the magnetic tape 5, and considerable deterioration of recording and playback accuracy.

On the other hand, this type of Pegasus data cartridge differs from a standard mini-data cartridge in which the entire cartridge 1 can be placed completely inside, and the passages of the magnetic tape 5 between the two tape reels 4 and the drive belt 10 between the drive roller 8 and the two corner rollers 9 are both extremely long. Additionally, the tape drive speeds difference according to CPUs of each maker: for example, since the range of 25 to 120 inch/sec. is extremely wide, it is very difficult to stabilize the tape tension and tape drive force for each tape drive speed.

As of the present, the Pegasus-type data cartridge of the prior art example has been utilizing the corner rollers of the standard mini cartridge as they are, for its corner rollers 9.

In other words, in the Pegasus-type data cartridge of the prior art example, as shown in FIG. 1(B), the outer diameter A1, which is the maximum diameter of the belt-winding surface 14 of the corner rollers 9, is 10.86 mm, the measurement of the inner diameter B1 which is the diameter of the center hole 13 is 3.22 mm, and the ratio of the inner diameter B1 to the outer diameter A1 is A1/B1=approx. 3.37.

However, in the prior art Pegasus-type data cartridge, since the outer diameter A1 of the corner rollers 9 is small, when the magnetic tape 5 is advanced, the rotation speed of the corner rollers 9 is high, friction loss at the corner rollers 9 is high, and the rotational load thereof is high. Friction loss is determined by moment relationship, and is proportional to the B1/A1.

Accordingly, the prior art Pegasus-type data cartridge is prone to fluctuations in the magnetic tape 5 and the drive belt 9 due to the large rotational load on the corner rollers 9 as well as the length of the passages of the magnetic tape 5 and the drive belt 10, as described above.

Figure 5A:
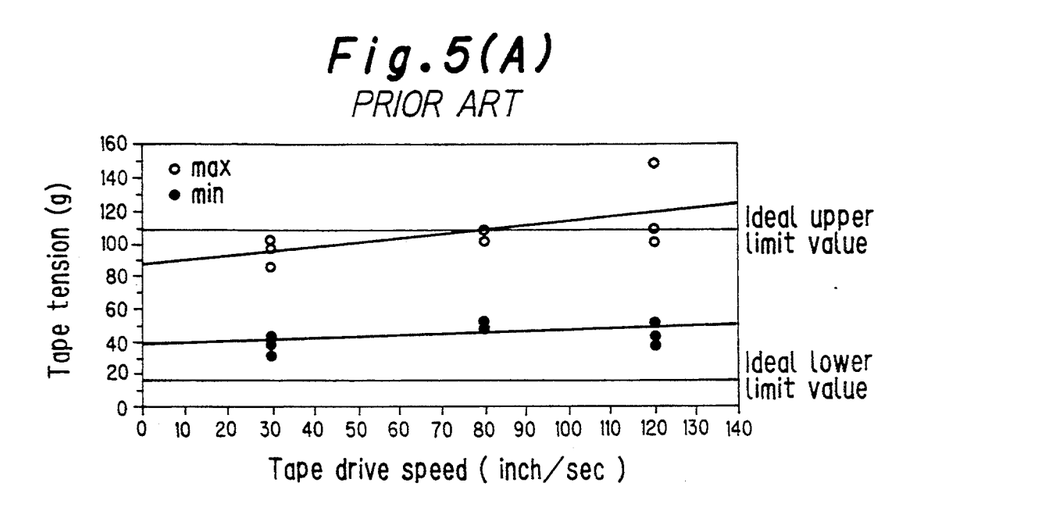
FIG. 5(A) and 5(B) are graphs showing the tape tension and tape drive force characteristics of a Pegasus-type data cartridge of the prior art.
Figure 5B:
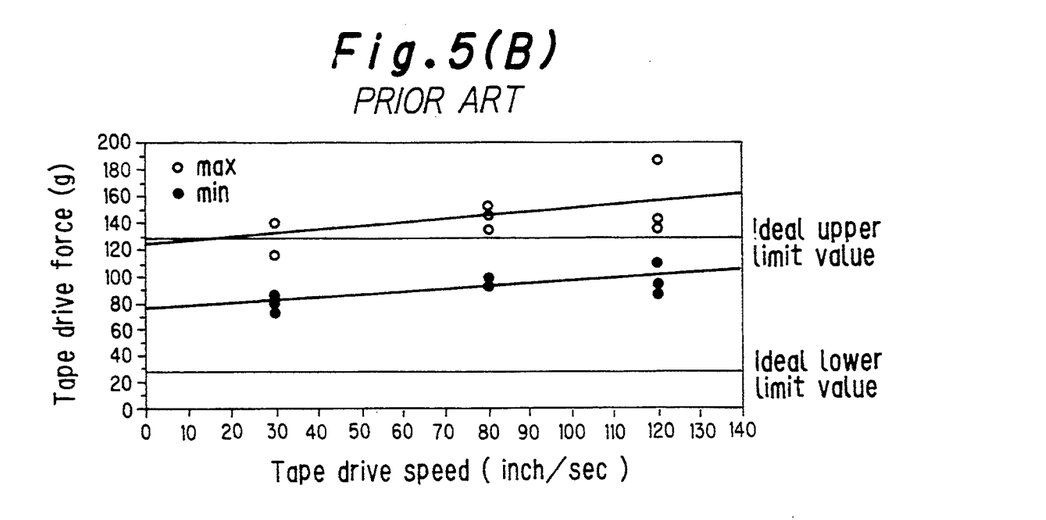

In FIGS. 5(A) and (B) are graphs showing measurements of the tape tensions and tape drive forces of the magnetic tape 5 of the prior art Pegasus-type data cartridge having corner rollers 9 with outer diameters A1 of 10.86 mm and inner diameters B1 of 3.22 mm, at the three tape drive speeds of 30 inch/sec., 80 inch/sec., and 120 inch/sec. The ideal upper limit value of the tape tension shown in FIG. 5(A), is approx. 108 g, while the ideal lower limit value thereof is approx. 17 g, and the ideal upper limit value of the tape drive force shown in FIG. 5(B) is approx. 128 g, while the ideal lower limit value is approx. 27 g.

As is clear from this graph, in the prior art Pegasus data cartridge, as the tape drive speed increases, there is more tendency for fluctuations to occur in the magnetic tape 5 and the drive belt 10 and the characteristic values of the tape tension and the tape drive force both rise considerably, the tape tension and tape drive force both departing greatly from their ideal upper limit values. Consequently, as the tape drive speed increases, the problems of contact deterioration occurring between the magnetic tape 5 and the magnetic head 25, deterioration of the tape advance of the magnetic tape, and significant distortion of recording and playback precision arise.

As a method for reducing the tape tension and the tape drive force, there is a method of reducing the elasticity of the drive belt 10, but as the elasticity of the drive belt 10 is reduced, winding perturbation of the magnetic tape 5 tends to occur with respect to the tape reels 4, and off-track problems occur with the magnetic head 25, therefore this solution is unacceptable.

Also, in the data cartridge of the prior art Pegasus-type, as shown by the one-dotted lines in FIG. 3, a pair of left and right connecting surfaces 1e connecting the left and right side surfaces 1c and 1d of the small width section 1A and large width section 1B of the cartridge 1 is formed parallel to the front panel 21a of the recording/playback device 21.

Consequently, in the state where the cartridge 1 is installed, with the small width section 1A of the cartridge 1 inserted in cartridge insertion slot 22 of the recording/playback device 21, one of the connecting surfaces 1e of the cartridge 1 is located very close to the eject button 26 provided in the front panel 21a, and since the gap G1 between the two is extremely small, there is the problem that it is very difficult for the operator to operate the eject button 26 with his/her finger.

The present invention has been arrived at in order to solve the above two problems, and its object is to provide a Pegasus-type data cartridge which can suppress an increase in the characteristic values of the tape tension and tape drive force even when the tape drive speed is increased, and in which the eject button can be easily operated in the state where the cartridge is installed in a recording/playback device.

SUMMARY OF THE INVENTION

In order to achieve the above object, the Pegasus-type data cartridge of the present invention comprises a cartridge integrally formed of a small width section which is inserted into a cartridge insertion slot of a playback and recording device, and a large width section which, in the state where the small width section is inserted in the cartridge insertion slot, projects substantially symmetrically in the left and right directions outside said cartridge insertion slot; a pair of left and right tape reels rotatably supported inside the large width section of the housing; magnetic tape, wound around the pair of left and right tape reels and fed across the front surface of the small width section of the housing; a drive roller rotatably supported inside the small width section of said housing; a pair of left and right corner rollers rotatably supported inside the large width section of the housing, each on a support axle provided in the housing; and a drive belt, wound in substantially a T-shape between the drive roller and the pair of left and right corner rollers, a pair of left and right drive sections thereof being in pressure contact with the outer circumference of a tape winding portion of the pair of left and right tape reels, the drive belt being rotatably driven by said drive roller, the pair of left and right tape reels being rotatably driven by the pair of left and right driving sections via the pair of left and right tape winding sections, and the outer diameter of the pair of left and right corner rollers being set approximately 4.5 times or more the inner diameter thereof.

Also, the Pegasus-type data cartridge of the present invention comprises a cartridge integrally formed of a small width section which is inserted into a cartridge insertion slot of a playback and recording device, and a large width section which, in the state where the small width section is inserted in the cartridge insertion slot, projects substantially symmetrically in the left and right directions outside said cartridge insertion slot; a pair of left and right tape reels rotatably freely supported inside the large width section of the housing; magnetic tape, wound around the pair of left and right tape reels and fed across the front surface of the small width section of the housing; a drive roller rotatably freely supported inside the small width section of said housing; a pair of left and right corner rollers rotatably freely supported inside the large width section of the housing, each on a support axle provided in the housing; and a drive belt, wound in substantially a T-shape between the drive roller and the pair of left and right corner rollers, a pair of left and right drive sections thereof being in pressure contact with the outer circumference of a tape winding portion of the pair of left and right tape reels, the drive belt being rotatably driven by said drive roller, the pair of left and right tape reels being rotatably driven by the pair of left and right driving sections via the pair of left and right tape winding sections, the length of the small width section of the housing in the insertion and extraction directions with respect to the cartridge insertion slot being formed longer than the depth to which the small width section is inserted into the cartridge insertion slot, and the connecting surface between the left and right side surfaces of the small width section and the left and right surfaces of the large width section is formed in a tapering shape which progressively widens in the extraction direction.

Since the Pegasus-type data cartridge of the present invention, constructed in the manner above, has a pair of left and right corner rollers whose outer diameters are 4.5 times the inner diameters thereof, the drive speed of these corner rollers is reduced from the prior art example, the rotational load thereon can be reduced from that of the prior art, and the tape tension and tape drive force can be stabilized.

Additionally, because the length of the small width section of the cartridge in the insertion/extraction direction of the cartridge insertion slot is formed longer than the depth to which the small width section is inserted into the cartridge insertion slot, and the connecting surfaces connecting the left and right side surfaces of the small width section and the left and right side surfaces of the large width section are formed in a substantially tapering shape which widens in the extraction direction away from the cartridge insertion slot, in the state where the small width section of the cartridge is inserted into the cartridge insertion slot, a sufficient space is formed between one of the connecting surfaces and the eject button of the front panel of the recording/playback device.

BRIEF DESCRIPTION OF THE DRAWINGS

These and other features, aspects and advantages of the present invention will become better understood with reference to the following description, appended claims, and accompanying drawings, wherein FIG. 1(A) cross sectional side view illustrating a corner roller of a Pegasus-type data cartridge of the present invention.

DETAILED DESCRIPTION OF THE PREFERRED EMBODIMENTS

Below, an embodiment of a Pegasus-type data cartridge to which the present invention is applied will be explained with reference to FIG. 1(A) and FIGS. 2, 4 and 6. Explanation of the prior art portions of FIGS. 3, 4 and 6 already explained above will be omitted here.

Firstly, in a Pegasus-type data cartridge of the present invention, as shown in FIG. 1(A), an outer diameter A2 which is the maximum diameter of a belt winding surface 14 of the pair of left and right corner rollers 9 has been enlarged to 15.5±0.05 mm over the 10.86 mm which is an outer diameter A1 of the prior art example shown in FIG. 1(B), this difference in diameter in millimeters being 4.64 mm. The diameter of the center hole of the corner rollers 9 which is the inner diameter B2 is 3.22 mm, the same as the prior art.

Accordingly, the proportion of the outer diameter A2 to the inner diameter B2 is A2/B2=approx. 4.81.

By way of the above, in the Pegasus-type data cartridge of the present invention, as shown in FIGS. 3 and 6, the rotation speed of the left and right corner rollers at the time when the magnetic tape 5 is traveling is, when compared to Pegasus-type data cartridge of the prior art, reduced by the amount corresponding to the diametric difference between the outer diameters A2 and A1 (4.64 mm), and the friction loss of these corner rollers 9 is reduced. Friction loss being determined by relation to moment, it is proportional to B2/A2 in FIGS. 1(A) and (B). Therefore, this decrease in friction loss is A2>A1, thus B2/A2<B1/A1.

Subsequently, by merely reducing the friction loss of the left and right corner rollers 9, the rotational load on the corner rollers 9 can be reduced, therefore fluctuation of the magnetic tape 5 and drive belt 10, which have long pass lengths, can be suppressed, and the tape tension and tape drive force of the magnetic tape 5 can be stabilized.

Figure 2A:
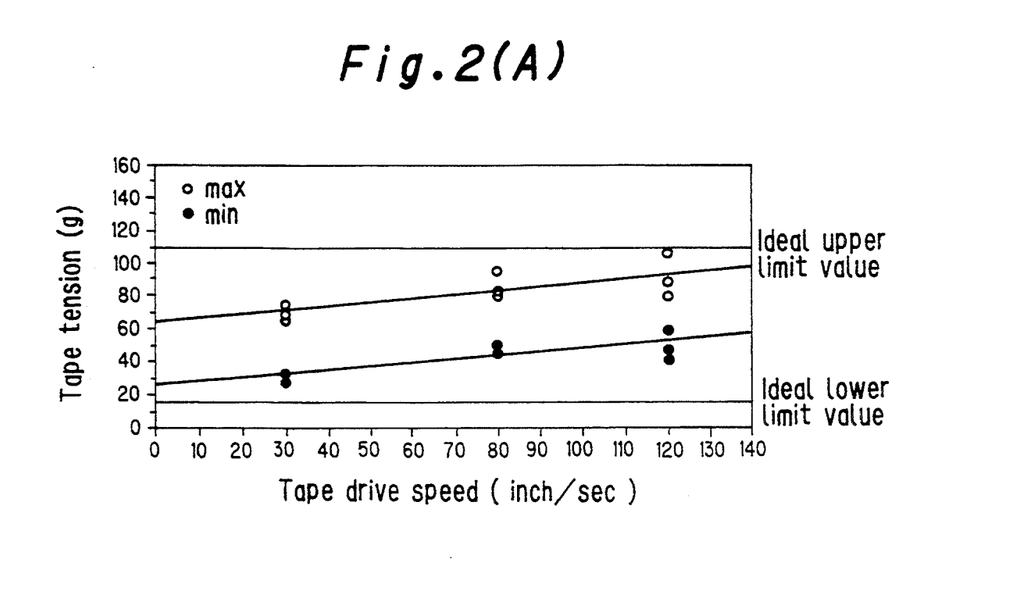
FIG. 2(A) and 2(B) are graphs showing the tape tension and tape drive force characteristics of the Pegasus-type data cartridge of the present invention.
Figure 2B:
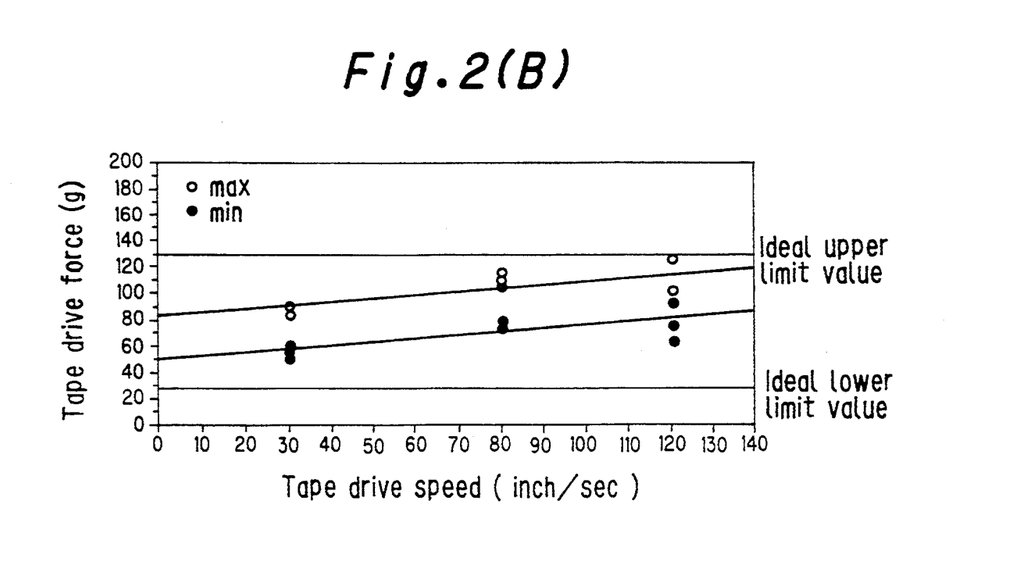

FIGS. 2(A) and (B) are graphs showing the tape tension and tape drive force of the magnetic tape 5 in the Pegasus-type data cartridge of the present invention, wherein the outer diameters A2 of both corner rollers 9 are 15.5±0.5 mm and the inner diameters B2 are, as in the prior art, 3.22 mm, measured at the 3 tape speeds of 30 inch/sec., 80 inch/sec., and 120 inch/sec.

As is clear from these graphs, in the Pegasus-type data cartridge of the present invention, even if the tape drive speed increases, the increase in the characteristic values of the tape tension and tape drive force are practically imperceptible, at all tape drive speeds the margin of the characteristic values of the tape tension and tape drive force is small, these characteristic values sufficiently satisfy the ideal upper and lower value limits, and extremely flat characteristic values can be attained.

Consequently, the Pegasus-type data cartridge of the present invention, even when the tape drive speed is high, stabilizes the tape tension and tape drive force of the magnetic tape 5 at low levels, thus as well as being able to maintain the preferred contact between the magnetic tape 5 and the magnetic head 25, it can significantly stabilize the travel of the magnetic tape 5 and considerably improve recording and playback precision. There is also the advantage that, since the tape drive force can be lowered, additional load on the spindle motor 23 is lessened and the life of the spindle motor 23 is extended.

However, the inventor of the present invention, when setting the outer diameter A2 of the corner rollers 9, utilized several types of samples (outer diameters A2 of 14.0 mm, 15.0 mm and 15.5 mm), and as a result of examining the application characteristics of each, it was found that if the ratio of the inner diameter B2 to the outer diameter A1 were approx. 4.5 times or more, the characteristics shown in the graph of FIG. 2 were satisfied. Although the actual measurement of the diameter A2 of the ratio of approx. 4.5 times or more is approx. 14.5 mm or more, without changing the position of the support axles 12 of the corner rollers 9 in the cartridge 1, the maximum value of the outer diameter A2 must necessarily be determined by the space in the cartridge.

Next, in the Pegasus-type data cartridge of the present invention, as shown by the solid lines in FIGS. 3 and 4, the length L1 of the small width section 1A of the cartridge 1 in the insertion direction (the direction of arrow a) and the extraction direction (the direction of arrow f) to and from the cartridge insertion slot 22 is formed longer than the insertion depth L2 of the small width section 1A in the cartridge insertion slot 22, and the connecting surfaces 1e between the left and right side surfaces 1c of the small width section 1A and the left and right side surfaces 1d of the large width section 1B are formed in a substantially tapering shape which widens in the extraction direction (the direction of arrow f). It is permissible to form the tapering shape of the connecting surface 1e as either an inclined surface inclined in a straight line at an angle of 45° or the like or a gently curving surface.

Thus, in the Pegasus-type data cartridge of the present invention, in the state where the small width section 1A of the cartridge 1 is inserted and installed in the cartridge insertion slot 22 of the recording/playback device 21, in the space between the connecting surface 1e and the eject button 26 in the front panel 21a of the recording/playback device 21 a space G2 large enough for the operator to push the eject button 26 with his/her finger can be formed.

Consequently, there is the feature that when the Pegasus-type data cartridge is to be ejected from the recording/playback device 21, the operator can easily insert his/her finger into the space G2 and operate the eject button 26 very easily.

The Pegasus-type data cartridge of the present invention constructed as above effects the following advantages.

Since the Pegasus-type data cartridge of the present invention can reduce the drive speed of these corner rollers from the prior art example, reduce the rotational load thereon from that of the prior art, and stabilize the tape tension and tape drive force by means of the pair of left and right corner rollers whose outer diameters are 4.5 times the inner diameters thereof, even when the tape drive speed is high, it can suppress the increase in the characteristic values of the tape tension and the tape drive force. Consequently, as well as being able to maintain the necessary contact between the magnetic tape and the magnetic head, it can stabilize significantly the tape travel of the magnetic tape, and remarkably improve the recording and playback precision. Also, since the tape drive force is reduced, the additional load on the drive motor of the recording/playback device is also reduced and the life thereof can be extended.

Additionally, because the length of the small width section of the cartridge in the insertion/extraction direction of the cartridge insertion slot is formed longer than the depth to which the small width section is inserted into the cartridge insertion slot, the connecting surfaces connecting the left and right side surfaces of the small width section and the left and right side surfaces of the large width section are formed in a substantially tapering shape which widens in the extraction direction away from the cartridge insertion slot, and in the state where the small width section of the cartridge is inserted into the cartridge insertion slot a sufficient space is formed between one of the connecting surfaces and the eject button of the front panel of the recording/playback device, when the Pegasus-type data cartridge is to be ejected from the recording/playback device 21, the operator can easily insert his/her finger into the space G2 and operate the eject button 26 very easily.

What is claimed is:

1. A data cartridge comprising:
   (a) a housing integrally formed of a first width section which is inserted into a cartridge insertion slot of a playback and recording device, and a second width section, wherein said second width section has a width greater than said first width section, which, in a state where said first width section is inserted in said cartridge insertion slot, projects substantially symmetrically in left and right directions outside said cartridge insertion slot;
   (b) a pair of left and right tape reels rotatably supported inside said second width section of said housing;
   (c) tape, wound around said pair of left and right tape reels and fed across a front surface of said first width section of said housing;
   (d) a drive roller rotatably supported inside said first width section of said housing;
   (e) a pair of left and right corner rollers rotatably freely supported inside said second width section of said housing, each on a support axle provided in said housing; and
   (f) a drive belt, wound between said drive roller and said pair of left and right corner rollers, one portion thereof being in pressure contact with an outer circumference of the tape wound around said pair of left and right tape reels, wherein:
   said drive belt is rotatably driven by said drive roller; and
   an outer diameter of an outer circumferential surface of said pair of left and right corner rollers, around which said drive belt is wound, is set at least 4.5 times an inner diameter of a hole in said pair of left and right corner rollers into which said support axles are inserted.

2. A data cartridge according to claim 1, wherein the length of said first width section of said housing in the insertion and extraction directions with respect to said cartridge insertion slot is formed longer than the depth to which said first width section is inserted into the cartridge insertion slot, and a connecting surface between left and right side surfaces of said first width section and left and right surfaces of said second width section is formed in a tapering shape which progressively widens in said extraction direction.

* * * * *